United States Patent [19]

Kunkle et al.

[11] Patent Number: 4,789,390

[45] Date of Patent: Dec. 6, 1988

[54] BATCH MELTING VESSEL LID COOLING CONSTRUCTION

[75] Inventors: Gerald E. Kunkle, New Kensington; George A. Pecoraro, Lower Burrell; Henry M. Demarest, Jr., Natrona Heights, all of Pa.

[73] Assignee: PPG Industries, Inc., Pittsburgh, Pa.

[21] Appl. No.: 68,375

[22] Filed: Jul. 1, 1987

Related U.S. Application Data

[63] Continuation-in-part of Ser. No. 927,567, Nov. 6, 1986, abandoned.

[51] Int. Cl.$^4$ ............................................... C03B 5/10
[52] U.S. Cl. ........................................ 65/27; 65/135; 65/136; 65/137; 65/337; 65/347
[58] Field of Search ................... 65/27, 126, 135, 136, 65/137, 337, 325, 346, 347

[56] References Cited

U.S. PATENT DOCUMENTS 4,676,819 6/1987 Radecki et al. ..................... 65/27 X Primary Examiner—Arthur Kellogg
Attorney, Agent, or Firm—Andrew C. Siminerio

[57] ABSTRACT

A lid of a glass batch melting vessel is subjected to corrosive and thermal degradation. The lid is cooled and the temperature of the exploded inner surface of the lid is controlled such that particulate and molten materials entrained in exhaust gas circulating within the vessel adhere to the lid surface forming a protective, insulating coating that prolongs the service life of the lid.

14 Claims, 3 Drawing Sheets

FIG. I

BATCH MELTING VESSEL LID COOLING CONSTRUCTION

This application is a continuation-in-part of U.S. Ser. No. 927,567 filed Nov. 6, 1986 now abandoned.

BACKGROUND OF THE INVENTION

1. Field of the Invention

This invention relates to high temperature heating vessels, and in particular, to technique for prolonging the service life of an lid for a glass batch melting furnace by protecting the inner exposed surface of the lid.

2. Technical Considerations

One type of glass melting process entails feeding of glass batch materials onto a pool of molten glass contained in a tank type melting furnace and applying thermal energy to melt the materials into the pool of molten glass. The melting tank conventionally contains a relatively large volume of molten glass so as to provide sufficient residence time for currents in the molten glass to effect some degree of homogenization before the glass is discharged to a forming operation U.S. Pat. No. 4,381,934 to Kunkle and Matesa, which teachings are incorporated by reference, discloses an alternative type of glass melting arrangement, and more particularly an intensified batch liquefaction process in which large volumes of glass batch materials are efficiently liquefied in a relatively small liquefaction vessel. This type of process, particularly when using intensified heat sources such as oxygen flame burners, produces relatively small volumes of high temperature exhaust gases.

During the heating and melting process, it is believed that certain components of the batch material vaporize. These vapors may be corrosive to exposed metal and refractory surfaces and when combined with the hot exhaust gas stream that circulates through vessels of the type disclosed in U.S. Pat. No. 4,381,934, corrode exposed interior surfaces, and in particular the vessel lid. In addition, the exhaust gas may entrain particulate matter within the vessel which may act as an abrasive on an exposed surface. This corrosive and abrasive gas stream greatly reduces the service life of the vessel lid which may result in increased costs and additional down time for lid repair and replacement.

The high temperatures within the vessel may also pose additional processing problems. For example, heat loss will effect the efficiency of the operation. The more heat that is lost during the liquefaction process through uninsulated and/or exposed interior surfaces of the vessel, the less efficient the liquefaction process becomes. This may require additional heat input to the vessel in order to account for the amount of heat lost. In particular, the removal of heat by cooling the vessel lid in order to reduce heat degradation and prolong service life reduces the overall heating efficiency of the operation. If this heat loss could be controlled and reduced, the overall efficiency of the operation would be increased.

It would be advantageous to have a heating vessel lid with a protective coating on its exposed inner surface that both insulates the lid, thus reducing heat loss from the heating vessel, and protects the exposed inner surface from a high temperature corrosive gas stream entrained with abrasive particulates, so as to increase its service life and decrease overall operating costs.

U.S. Pat. No. 3,165,301 to Riviere teaches a method and device for protecting refractory walls. A burner positioned in the roof of an elongated horizontal furnace flows a gaseous suspension of carbon particles along the roof to protect the roof against heat radiating from the flame formed by burners in the furnace. The carbon particle suspension is circulated within the furnace parallel to the roof and in a direction opposite to that of the main burner flame. The arrangement requires additional gas to be added to the heating system. Furthermore, the carbon particles are an additional contaminant in the heating operation.

U.S. Pat. No. 4,021,603 to Nanjyo et al teaches a cooled metal roof assembly for an arc furnace with refractory liner to protect the interior roof surface from high heat. Fire brick or other refractory material is provided within grooves formed on the interior surface of the roof to improve resistance to heat of the furnace roof assembly. The refractory material must be periodically replaced in order to ensure proper thermal insulation. In addition, the center portion of the lid is a consumable substructure that includes three hole for electrodes. There is no protection provided to this portion of the lid.

U.S. Pat. No. 4,182,610 to Mizuno et al teaches a water cooled metal cover for steel making or smelting furnace. Fins in the form of a lattice structure extend from the interior surface of an annular portion of the cover to provide a surface to which slag resulting from splashes within the furnace may adhere. The splashes of slag that adhere to the fins insulate the lower surface of the cover's cooling jacket. The center portion of the cover which includes openings for electrodes, does not have the lattice structure to accumulate the slag so that there is no protection provide on this portion of the lid. In addition, the random splashing of the slag does not provide a uniform buildup of insulating material over the entire cover surface.

U.S. Pat. No. 4,434,495 to Tomizawa et al. teaches a cooling pipe structure for arc furnaces. Wherein cooling pipes are embedded within refractory blocks. The pipes are positioned adjacent to the surface of the block facing the inside of the furnace to intensify the cooling of the surface. Slag plashed against the block surface will congeal and adhere to the block to form an insulating film.

The prior teaches lid construction furnaces but does not disclose controlling the cooling of the lid to permit materials entrained in hot gases circulating within the furnace to be deposited on the inner surface of the lid to form a relatively uniform and continuous insulating and protective layer herein thickness of the layer, and its associated insulative properties may be adjusted by varying the cooling of the lid.

SUMMARY OF THE INVENTION

An object of this invention is to provide a protective layer on an exposed inner surface of a heating vessel. Hot exhaust gas which circulates within the vessel includes entrained particulate and molten materials, which may corrode and thermally degrade exposed surfaces within the vessel. The surfaces are cooled such that the particulate and molten material that contacts the surface will condense and stick to the surface. Additional entrained material build up on previously deposited material so as to increase the material layer thickness. This layer both thermally insulates the surface and protects it against corrosion from materials within the circulating exhaust gas stream. As the layer thickness increases, so does to insulative properties. When the temperature within the heating vessel is sufficiently high, newly deposited material on the layer will be melted off so as to maintain a relatively constant layer thickness over the surface. The cooling rate of the lid or the heating rate within the heating vessel may be varied in order to change the thickness of the built-up layer.

Another object of this invention is to provide a heating vessel lid with a controlled cooling arrangement that allows materials entrained in exhaust gas circulating within the vessel to be deposited on an inner surface of the lid and build up a protective, insulating layer.

DETAILED DESCRIPTION OF THE INVENTION

This invention is suitable for use in a process wherein a hostile environment adversely effects the exposed interior surface of a heating vessel. It is particularly well suited for use in a heating process where high temperatures and additional conditions within the heating vessel such as circulation of corrosive and abrasive materials accelerate the wear of portions of the lid or roof of the heating vessel. The invention is presented in connection with a glass liquefaction process of the type taught in U.S. Pat. No. 4,381,934 but it is to be understood that the invention can be used in any heat related process where heat loss is to be reduced or exposed surfaces such as heating vessel walls require an insulating and/or protective coating.

Figure 1:
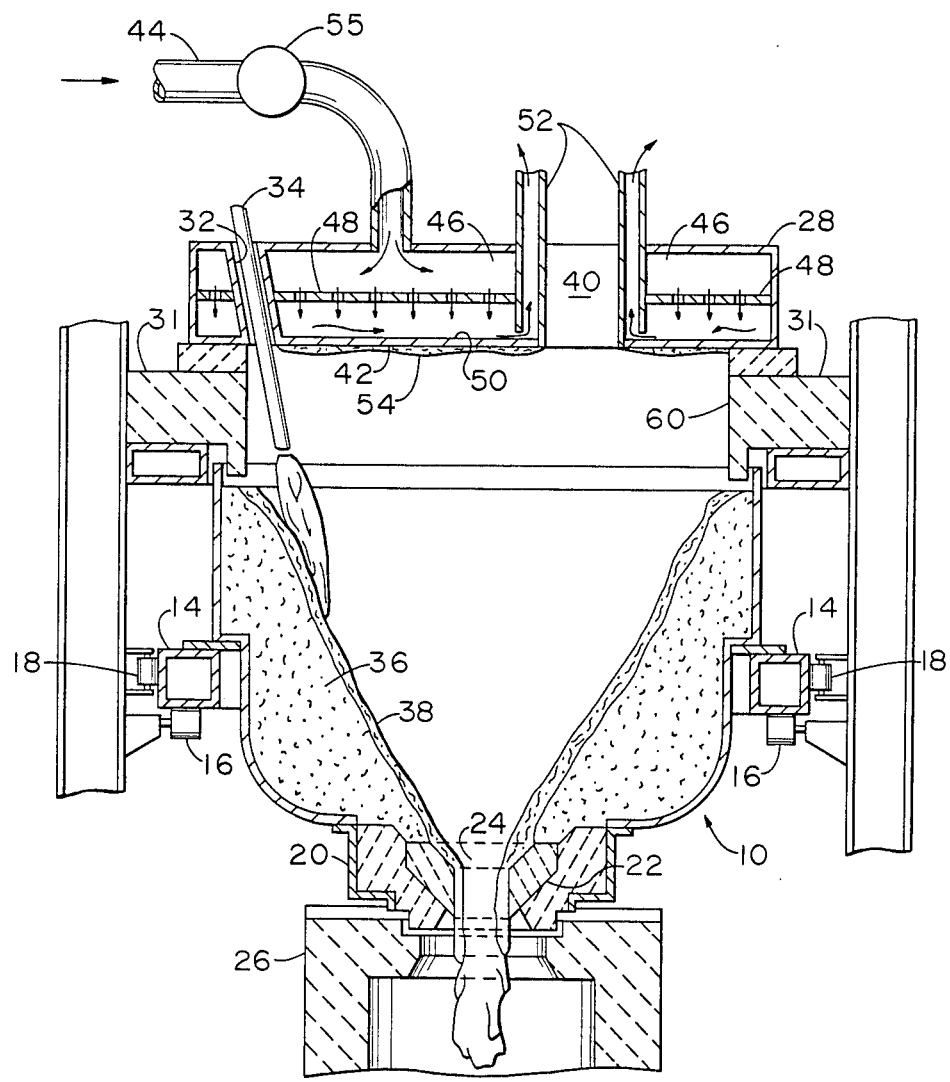
FIG. 1 is a cross-sectional view of a liquefaction vessel illustrating the preferred embodiment of the present invention.

With reference to FIG. 1, the liquefaction vessel 10 is of a type similar to that disclosed in U.S. Pat. No. 4,381,934 which is incorporated by reference herein. The vessel 10 includes a steel drum 12 supported on a circular frame 14 which is in turn mounted for rotation about a generally vertical axis corresponding to the center line of the drum 12 on a plurality of support rollers 16 and aligning rollers 18. An outlet assembly 20 below the drum 12 includes a bushing 22 with an open center 24 leading to a collecting vessel 26. A lid 28 is provided with stationary support by way of a circular frame 30 including lid support blocks 31. The lid 28 includes at least one opening 32 for inserting a burner 34. The burner 34 is preferably a multi-port burner and is preferably fired with oxygen and gaseous fuel, such as methane, but can be any type of heat source that produces hot gases to heat batch material 36 within the vessel 10, e.g., plasma torches.

With the vessel 10, a layer of unmelted batch 36 is maintained on the walls of the drum 12 encircling a central cavity within which combustion and liquefaction takes place. The heat from the flame of the burners 34 causes a portion 38 of the batch 36 to become liquefied and flow downwardly through the bottom opening 24. The liquefied batch 38 flows out of the liquefaction vessel 10 and may be collected in the vessel 26 below the liquefaction vessel 10 for further processing as needed. The exhaust gases escape upwardly through an opening 40 in the lid 28 into an exhaust duct (not shown) or through an opening in the bottom of the heating vessel (not shown).

During the liquefaction process in the vessel 10, various materials become entrained in the hot exhaust gas from the burners 34. For example, in a typical soda-lime-silica batch these entrained materials may include vapors such as, but not limited to, sodium hydroxide and particulates such as, but not limited to, sodium sulfate or sodium carbonate, all of which are highly corrosive to metal and refractory materials. At the elevated temperatures within the heating vessel 10 the chemical attack on exposed interior surfaces of the vessel 10 is accelerated. In addition, abrasive particles within the vessel 10 may combine with the hot exhaust gas to form a corrosive and abrasive gas stream that circulates within the vessel 10. The interior surface 42 of the lid 28 presents a large exposed surface within the vessel 10 that is susceptible to this high temperature attack.

In general, the surface 42 is made of a corrosive resistant steel such as, but not limited to, chrome alloy steel. Although not limiting in the present invention, in the preferred embodiment of the invention the lid 28 is preferably a fluid cooled metal lid as shown in FIG. 1. A cooling fluid, for example air or water, enters the lid 28 through inlet 44 and flows into plenum 46. The fluid then passes through perforate plate 48 to distribute the cooling fluid along inner surface 50 of the exposed interior surface 42 of the lid 28. The fluid circulates along the inner surface 50 and exits the lid 28 through outlet 52. The arrows in FIG. 1 show the circulation of the cooling fluid through the lid 28. As the fluid circulates through the lid 28 it extracts heat from the interior surface 42 so as to maintain a surface temperature of surface 42 lower than that of the interior of the vessel 10. The removal of excess heat through the lid 28 in order to maintain a relatively low temperature of the lid 28 thus reducing heat degradation and prolonging its service life may result in an inefficient heating operation since additional heat must be added to the system in order to effect the amount of heat lost or removed.

In the preferred embodiment of the invention, the surface 42 is cooled to a temperature such that material circulated by the hot exhaust gas within the vessel 10 will begin to adhere to it. In the initial stages of the vessel 10 heatup, the exhaust gas with the vessel 10 may include, but is not limited to, entrained airborne particulates such as sand grains, dolomite and limestone, molten sodium carbonate, and molten glass cullet particles. At a sufficiently low lid surface 42 temperature, material such as molten glass cullet and sodium carbonate will condense and "freeze" on the lid surface 42 with additional glass cullet and sodium carbonate, as well other solid particulate materials and condensed vapors, building up thereon. This built-up layer 54 has a coefficient of thermal conductivity at least an order of magnitude lower than the metal lid 28 and therefore provides an insulating effect so that more heat stays within the vessel 10 and less is removed through the cooled lid 28. As the temperature within the vessel 10 increases due to less heat loss, additional particulates within the exhaust gas stream begin to soften and also stick to the previously deposited batch layer 54 further increasing its insulating qualities. This in turn further reduces the heat loss through the lid 28 and increase the temperature within the vessel 10. In addition, unsoftened particulates are captured by the heat softened layer, further adding to its thickness and insulative properties. At a sufficiently high temperature within the vessel 10, the deposited material in layer 54 will start to melt at the surface exposed to the interior of the vessel 10 and drip back into the vessel 10, thus limiting the thickness of the batch layer 54 buildup and maintaining it at a generally constant layer thickness, with a correspondingly reduced heat loss. At this steady state condition, the final batch layer 54 thickness will directly relate to the type of material being heated and the interior temperature within the vessel 10. As a result, it is clear that the relationship between the engineering of the vessel and type of material within the vessel 10 requires balancing the cooling of the lid 28 and the temperature within the vessel 10 so as to develop the layer 54 thickness required for a specific heating process.

It should be noted that the surface 42 should be of a material that is not early oxidized because the metal oxide may combine with the material in the layer 54 to form an interface layer having a lower melting point than the layer 54. As a result the interface layer will loosened from lid 28, and the layer 54 will fall back into the vessel 10 exposing the lid surface 42. In addition, if the metal does become oxidized care must be taken that any oxides formed on the lid surface 42 will not add any color or any other detrimental contaminants to the resulting glass if the oxides become incorporated into the glass.

The batch layer 54 thickness can be modified by changing the heating rate within the vessel 10 or the cooling rate of the lid 28. For example, if the amount of heat provided by the burners 34 is reduced, the layer thickness will increase since the temperature within the vessel 10 would be lower, thus allowing the layer thickness to increase before the insulating properties of the layer raise the internal temperature of the vessel 10 to that required to melt the exposed outer surface of the layer 54. Conversely, by increasing the amount of heat provided by the burners 34 the thickness of layer 54 can be reduced. As discussed, the thickness of the layer 54 can also be modified by changing the cooling rate of the lid 28. Although not limited in the present invention, a valve 55 at inlet 44 may control the flow of cooling fluid in the lid 28 as shown in FIG. 1. In particular, by increasing the cooling rate, the amount of heat removed from the system through the insulating layer is increased thus cooling the layer 54 and allowing its thickness to increase until the increased insulating effect of the layer increases the internal temperature of the vessel to that required to melt the exposed surface of the layer 54.

The batch layer 54 provides several interrelated functions. The layer 54 protects the surface against abrasive particles circulating within the vessel. It is contemplated that some of the particulates will get "stuck" to the layer and become part of the layer 54 itself. The layer 54 further functions as an insulator that both reduces the heat loss within the heating vessel 10 through the lid 28, and lowers the temperature of the lid surface 42, thus reducing the effects of heat degradation. The layer 54 also seals the lid surface 42 and protects it from chemical attack. Specifically, the layer 54 provides a barrier between the surface 42 of the lid 28 and oxygen, moisture, and corrosive vaporous gases that circulate within the vessel 10, such as, but not limited to, sodium sulfate, all of which will attack and corrode the lid surface 42. In addition, since chemical reactions are generally accelerated at high temperatures, the reduced temperature of the surface 42 of the lid 28, due to the insulating layer 54, reduces the rate of any chemical attack at the lid surface 42 by corrosive materials and thus prolongs the lid life.

Figure 2:
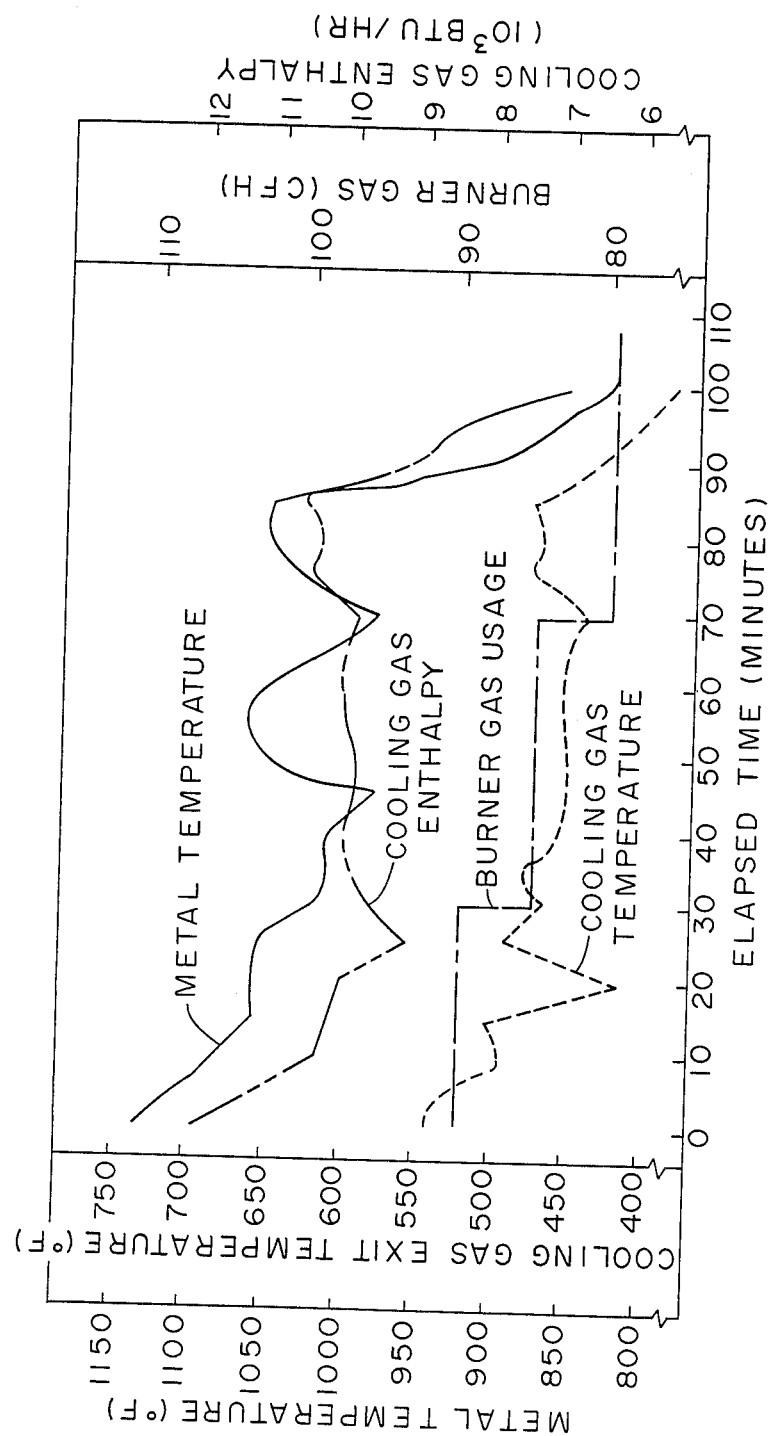
FIG. 2 is a graph showing the insulating properties of a cooled metal lid used in a liquefaction vessel as batch material adheres to the interior lid surface.

FIG. 2 illustrates the effects on a lid of batch layer 54 buildup with respect to temperature and burner gas usage for a liquefaction vessel similar to that shown in FIG. 1. In this example, the cooling gas was air. It should be noted that the reduction in the burner gas usage at elapsed time intervals of 30 minutes and 70 minutes was made to maintain a generally constant internal temperature within the vessel 10 as the insulating layer 54 began to buildup on the lid. Referring to FIG. 2 prior to the batch buildup on the lid, the metal temperature was approximately 1140° F. (616° C.), cooling gas enthalpy was approximately $115 \times 10^3$ BTU's per hour, cooling air exit temperature was approximately 550° F. (291°0 C.) and the burner gas usage was approximately 90 cubic feet per hour (CFH) at approximately 85° F. (29° C.) ambient temperature. After about 100 minutes of allowing the batch layer to build up on the lid, these values were 825° F. (441° C.), $6.5 \times 10^3$ BTU's per hour, less than 400° F. (204° C.) and 80 CFH, respectively. As can be seen, the lid metal temperature, cooling gas enthalpy, and cooling gas exit temperature were all significantly reduced due to the batch layer buildup on the lid. It is believed that the two peaks in the metal temperature of the lid at elapsed times 55 minutes and 85 minute as shown in FIG. 2 may have been due portions of the built up layer falling off of the lid surface 42 and the subsequent restabilization of the lid temperature. In general, it is expected that maintaining a lid surface 42 temperature of approximately 900°0 F.±150° F. (481° C.±66° C.) in a liquefaction vessel 10 with an internal vessel temperature sufficient to liquify a typical soda-lime-silica glass batch, will form an insulating and protective layer between ⅛ inches to ¾ inch (0.32 cm to 1.91 cm) thick depending on heating and cooling conditions and batch formulation.

Figure 3:
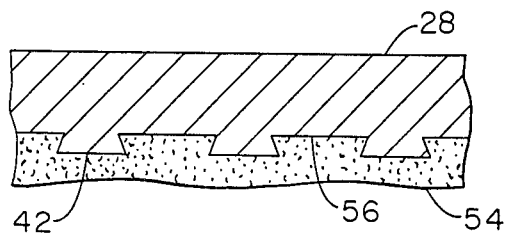
FIGS. 3, 4 and 5 are enlarged cross-sectional views of alternate embodiments of the present invention.
Figure 4:
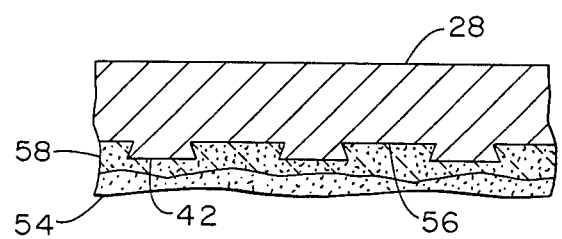

As the layer 54 increases in thickness, it is possible that a portion of the layer 54 may fall off exposing an area of the interior surface 42 of the lid 28. As a result, there may be a temporary loss of insulating effect requiring sudden change in heating and cooling demands. This may lead to difficulty in controlling internal vessel temperature and the amount of coolant required for the lid 28. If desired, the surface 42 of the lid may include anchoring devices such as, but not limited to, grooves 56 to accommodate and hold the batch. The grooves 56 may be on the order of 3/32 inches (0.24 cm) deep. Referring to FIG. 3, although not limiting to the invention, the grooves 56 may be dovetailed in shape to help secure the batch layer 54 to the surface 42. The grooves 56 also provide additional surface area for initial layer 54 built up and may distribute and reduce surface-to-surface shearing forces between the layer 54 and lid surface 42 due to temperature change in the vessel 10. Referring to FIG. 4, the initial adhesion of the lid 54 to the surface 42 may be enhanced by coating the surface 42, whether it be smooth or grooved, with a refractory cement 58 which provides an initial insulation in the vessel 10 and better adhesion of the layer 54 due to the resulting higher temperature formation of the initial portions of the layer 54.

Figure 5:
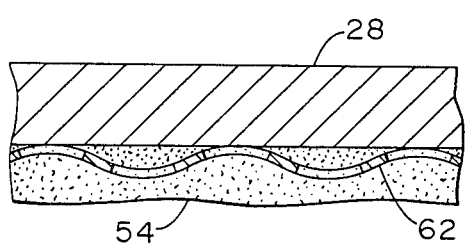
Figure 6:
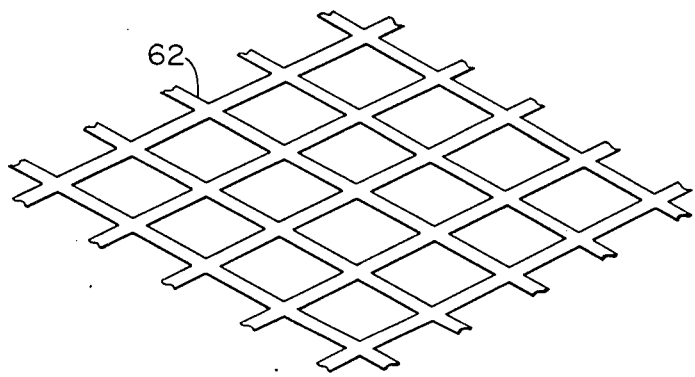
FIG. 6 is a plan view of the expanded metal shown in the embodiment illustrated in FIG. 5.

FIGS. 5 and 6 illustrate an additional embodiment of the present invention. In order to further anchor layer 54 to lid 28, foraminous members 62, such as expanded metal, perforated plates, or screening are secured to surface 42 of the lid 28. The foraminous members 62 must be heat resistant and adquately attached to the 28 so as to help support the layer 54 as it builts on the lid surface 28. Although not limiting in the present invention, FIG. 6 illustrate an expanded metal configuration that may be used. In one particular embodiment of the invention, No. 16 expanded metal fabricated from 410 stainless steel is tack welded at approximately 2 to 3 inch centers (5.08 to 7.62 cm) to the lid 28.

It should be appreciated to those skilled in the art that the benefits attributable to the batch layer 54 in the cooled metal lid 28 are equally attributable to a lid of any construction, for example, refractory blocks. The layer 54 will help seal and insulate the lid, maintain lower heat loss within the vessel 10, provide protection against accelerated chemical and abrasive attack and keep the refractory surface at a lower temperature and thus increase its effective service life. In addition, the present invention may be used to protect exposed portion within this vessel 10 other than the lid 28. For example, the present invention may be used to provide a protective layer on the inner surface 60 of lid support blocks 31. Furthermore, blocks 31 may be constructed in a manner similar to that of the lid 28 shown in FIG. 1 i.e., fluid cooled, metal construction, so that the cooling rate of the blocks 31 may be controlled to vary the thickness of a built-up protective layer.

It is understood that the particular configuration of the cooled lid 28 and surface 42 are not limiting to the invention. Further modifications of the invention, as will be apparent to one skilled in the art can be made without departing from the spirit of the invention, the scope of which is defined by the claims which follow.

We claim:

1. In a method of liquefying pulverulent batch material including the steps of depositing said material into an enclosed heating vessel along a sloped surface substantially encircling a cavity in said vessel, raising the temperature within said vessel with a high velocity combustion type heating means to liquefy said material wherein said heating means is positioned to direct heat along said sloped surface and exhaust gas from said heating means circulates within said vessel, and removing said exhaust gas from said heating vessel, wherein said circulating exhaust gas includes entrained particulate and molten material resulting from liquefying said batch material having corrosive properties which degrades selected exposed lid surface portions of said vessel as said exhaust gas circulates within said vessel prior to exiting said vessel, the improvement comprising:

cooling said exposed surface to a temperature such that said entrained, circulating particulate and molten materials contacting said cooled surface adhere to said surface and form a protective layer on said surface; and controlling the cooling of said surface during said cooling step so as to adhere additional materials entrained in said circulating exhaust gas to said materials previously adhered to said surface and adjust the thickness of said layer.

2. The method as in claim 1 wherein said protective layer thermally insulates said exposed lid surface and further including the step of increasing the thickness of said layer until the temperature with said vessel is sufficient to melt newly deposited entrained material on said layer so as to maintain relatively constant layer thickness on said surface and a relatively constant heating temperature within said vessel.

3. The method as in claim 2, further including the step of varying the amount of heat in said vessel so as to vary the thickness of said layer.

4. The method as in claim 1 further including the step of coating said lid surface with a refractory cement prior to said heating step.

5. The method as in claim 1 further including the step of providing anchors on said exposed lid surface to help secure said layer to said exposeed lid surface.

6. The method as on claim 1 further including the step of securing heat resistant foraminous members to exposed lid surface to help secure said layer to said exposed lid surface.

7. The method as in claim 1 wherein said material in glass batch.

8. In an apparatus for melting material of the type having a heating vessel with a lid, means to deposit said material along a sloped surface substantially encircling a cavity in said vessel, a high velocity combustion type heating means to direct heat along said sloped surface and melt said material wherein exhaust gas from said heating means circulates within said vessel, and means to remove said exhaust gas from said vessel wherein said circulating exhaust gas includes entrained particulate and molten materials resulting from the melting of said material having corrosive properties which degrades selected exposed surface portions of said lid as said exhaust gas circulates within said vessel prior to exiting said vessel, the improvement comprising:

means to cool said exposed lid surface portions such that entrained circulating particulate and molten materials adhere to said surface forming a protective layer; and means to control said cooling means to adjust the thickness of said protective layer.

9. The lid as in claim 8 further including means to increase the surface area of said exposed surface.

10. The lid as in claim 8 further including means to anchor said layer to said exposed surface.

11. The lid as in claim 8 wherein said exposed surface includes grooved surface portions.

12. The lid as in claim 8 further including foraminous members secured to said exposed surface of said lid.

13. The lid as in claim 12 wherein said foraminous member is expanded metal.

14. The lid as in claim 8, wherein said batch material is glass batch material.

* * * * *